July 7, 1953
R. J. CHILDRESS
2,644,722
AUTOMATIC DIVERTER FOR PNEUMATIC CONVEYERS
Filed May 22, 1950
2 Sheets-Sheet 2
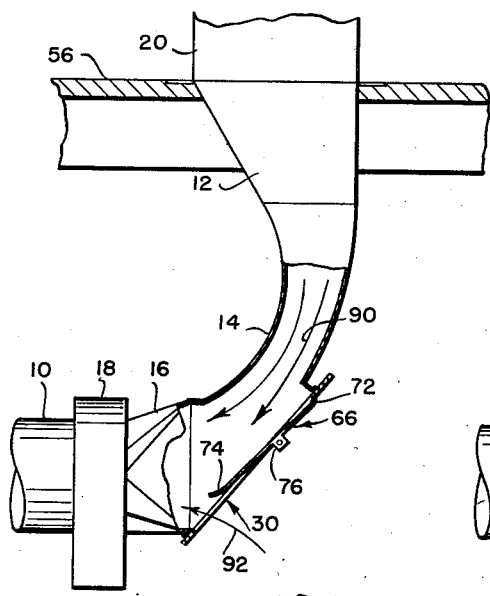
FIG. 4
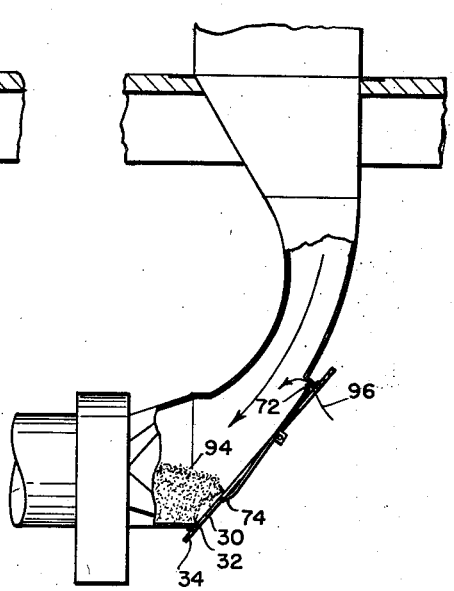
FIG. 5
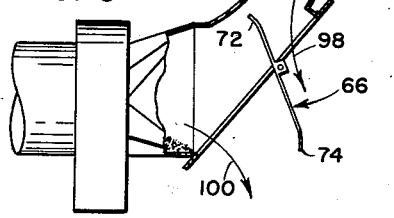
FIG. 6
FIG. 7
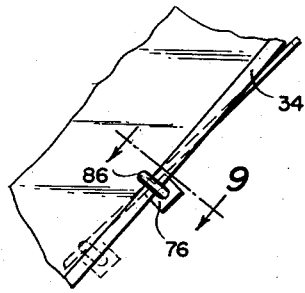
FIG. 9
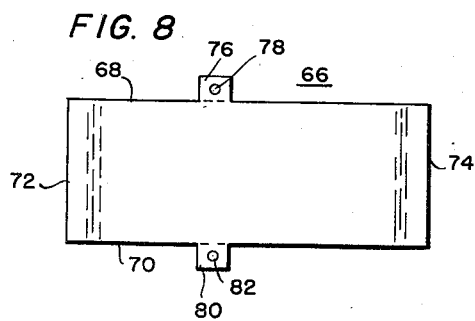
FIG. 8
INVENTOR
RANDALL J. CHILDRESS
BY *William C. Babcock*
ATTORNEY Patented July 7, 1953

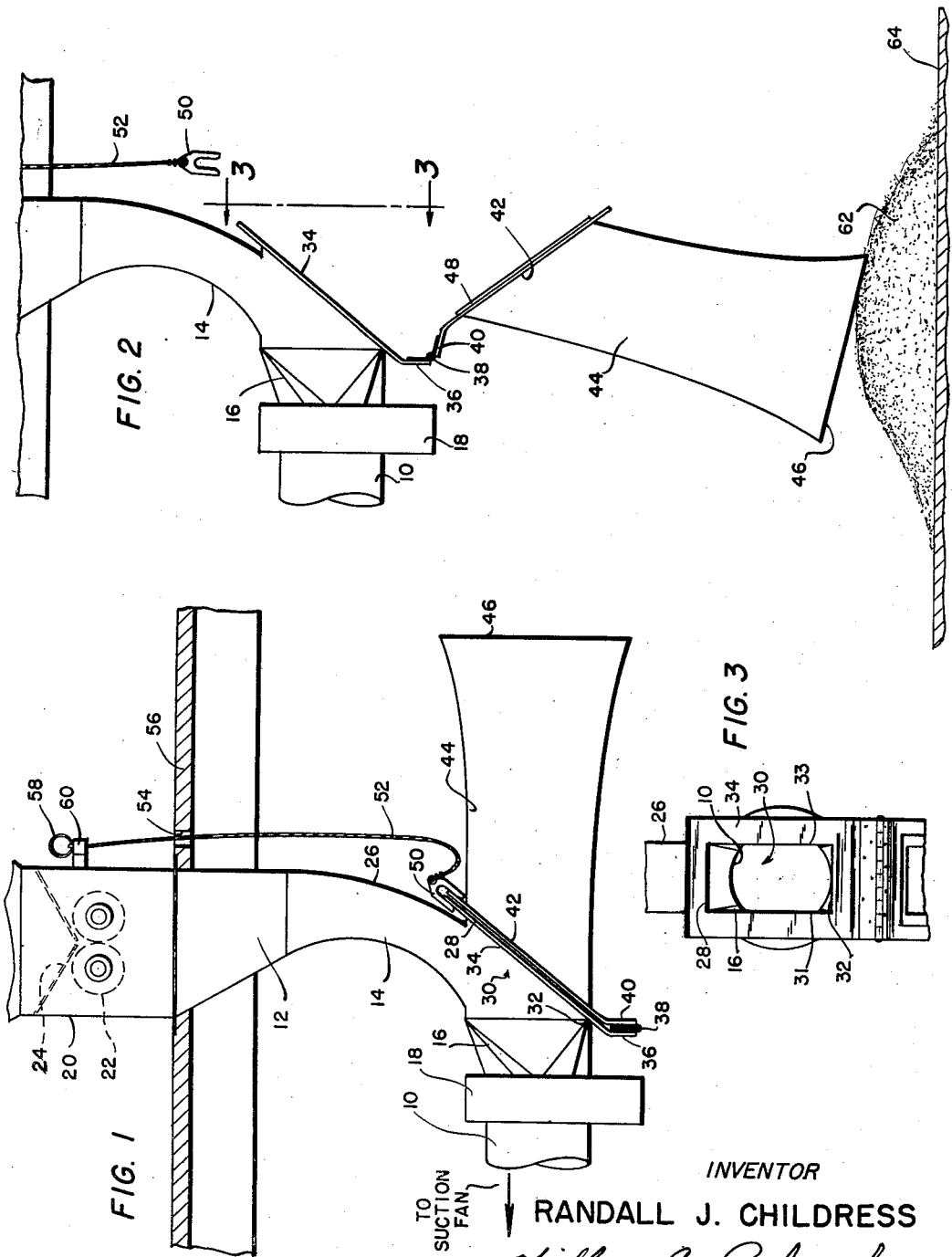

2,644,722

UNITED STATES PATENT OFFICE 2,644,722

AUTOMATIC DIVERTER FOR PNEUMATIC CONVEYERS

Randall J. Childress, Norwalk, Calif., assignor to General Mills, Inc., a corporation of Delaware Application May 22, 1950, Serial No. 163,554

12 Claims. (Cl. 302—32)

This invention relates to pneumatic conveyers, and more particularly to an improved automatic valve or diverter for such a conveyer.

Pneumatic conveyers are well known in which material is fed into a suitable suction leg or tube and is transported through the tube by the flow of air therethrough. One problem in such conveyers involves the introduction of the material to be conveyed. If this material is fed by gravity from a supply hopper or other chute, it sometimes happens that the rate of supply of material is so great that the suction leg becomes clogged. The supply chute is then choked in turn, and the work required to clear the lines is both time-consuming and expensive.

It is accordingly one object of the present invention to provide improved means for diverting the stock at the supply inlet of a pneumatic conveyer, when the conveyer becomes choked.

A further object is the provision of an automatic valve or diverter in combination with an air inlet, at the junction between the material supply chute and the main conveyer leg.

Another object is the provision of an automatic diverter for a pneumatic conveyer, which will automatically divert the supply of material away from the conveyer when the latter becomes choked.

Other objects and advantages of the invention will be apparent from the following specification in which a preferred embodiment of the invention is described.

In the drawings forming a part of this application, and in which like reference characters indicate like parts, Figure 1 is a side elevation, partly in section, showing construction of the material supply chute and air intake in a prior art pneumatic conveyer.

Fig. 2 is a similar view illustrating a manual means for diversion of the stock.

Fig. 3 is a view on the line 3—3 of Fig. 2 looking down the main conveyer tube through the air inlet.

Fig. 4 is a partial sectional view with certain portions broken away, showing the device of Figs. 1 and 2 modified according to the present invention.

Fig. 5 is a view similar to Fig. 4, but illustrating the choking of the main conveyer leg.

Fig. 6 is a similar view illustrating the manner in which the automatic diverter according to the present invention feeds the stock away from the main conveyer leg while the choked condition is relieved.

Fig. 7 is an enlarged partial side view showing details of the mounting of the diverter plate and the manner of its adjustment.

Fig. 8 is a plan view of a blank from which a diverter plate can be formed, and

Fig. 9 is a partial sectional view on the line 9—9 of Fig. 7.

As shown in Figs. 1 and 2, a typical prior art pneumatic system includes a main suction leg or conveyer tube 10, which is illustrated as substantially horizontal, but may also be inclined. A suction fan (not shown) is connected at the remote end of this suction leg in order to draw air through the conveyer tube 10 and to convey the desired material by means of such air flow.

The material to be fed to the conveyer tube 10 is fed from a supply hopper 12 through an inlet chute 14 having a substantially rectangular cross section. An intermediate section 16 provides for a change in cross section from the rectangular section of the chute 14 to the ultimate circular section of the conveyer tube 10. Between this intermediate section 16 and the conveyer tube 10 is an adjustable auxiliary air inlet device 18 of known construction.

In the present case, the supply hopper 12 is indicated as communicating directly with a roll stand 20 for milling wheat or other grain into flour. The machine 20 includes rolls 22 between which the material is uniformly fed from a supply hopper or distributor 24. The stock which is formed by the rolls 22 then enters the supply hopper 12 and supply chute 14 and is fed to the main conveyer leg 10.

The material inlet chute 14, which is of rectangular cross section, has a lower or rear wall 26 which is inclined from the supply chute toward the main conveyer tube and which serves as a means for guiding and supporting the material as it is fed downwardly by gravity to the conveyer leg 10.

In this lower wall 26 an air inlet opening 30 is provided. As indicated in Figs. 1 and 3, the air inlet opening 30 is substantially rectangular in plan and is defined by upper and lower edges 28 and 32, respectively, and parallel sides 31 and 33. A rectangular framework having outwardly projecting flanges 34 surrounds and defines the opening. This frame 34 is inclined along the plane of the lower wall 26 of the inlet supply chute 14 and includes a depending extension 36 at its lower end on which hinges 38 are located. These hinges 38 support a similar flange 40 of a corresponding framework 42 at one end of an air intake chute or bell 44. This air intake section, which is sometimes referred to as a cascade section, has an outwardly flared end 46 through which air enters the cascade 44 to be fed through opening 30 and along the conveyer tube 10.

The material dropped from the rolls 22 and passing downwardly through the hopper 12 and supply chute 14 will thus be entrained in the air currents rushing in toward the main conveyer tube 10.

It should be noted that, in this installation, the conveyer tube 10 draws air from three sources. The first source is the air inlet or cascade 44. The second is the supply chute 14, and the third is the adjustable circumferential auxiliary air inlet 18, the details of which have been omitted since they form no part of the present invention.

A gasket 48 may be carried by the frame member 42 of the air inlet valve 44 in order to form an air tight seal between the frame members 34 and 42. These frame members, which are hinged together at 38, are normally held in the position of Fig. 3 by a suitable clip 50. Clip 50 has a release cord 52 which in this particular case extends upwardly through an opening 54 in the floor 56 on which the roll stand 20 is mounted. At its upper end the cord 52 is provided with a ring 58 which is removably carried by a bracket 60 on the roll stand 20.

Ordinarily, the device will be operated in the position of Fig. 1. During such operation, however, it sometimes happens that the main conveyer tube 10 becomes partially or fully choked. In such a situation, if the rolls 22 are operating on stock continuously received at that point, the stock fed from the rolls will gradually back up through the intermediate sections 16, supply chute 14, and hopper 12 and may even choke the system all the way up to the rolls 22.

It has therefore been necessary to have an operator watch the operation of the conveyer leg relatively closely and pull the ring 58 to release the clamp 50 whenever the choked condition threatened to clog the roll stand.

When the clamp 50 is pulled in such an emergency, the inlet valve 44 is permitted to swing downwardly to the position of Fig. 2. The framework 34, and the opening 30 defined thereby, lie directly beneath the supply chute portion 14. Therefore any material which is choked in this chute can drop directly by gravity to the lower floor as shown by the pile of material 62 on floor 64 in Fig. 2.

As soon as the choked condition within conveyer tube 10 is relieved, a process which in the past has consumed considerable time and effort, then the air inlet can be restored to the position of Fig. 1 and the clamp 50 replaced, while normal operation is then resumed.

Since the equilibrium condition in a pneumatic conveyer of this type is rather critical, and since the flow of stock from the roll stand may vary from time to time, there have been frequent situations in which the conveyer tube 10 has become partially or fully choked and necessitated the release of clamp 50 to dump material on the floor. It will be understood that as long as the conveyor leg 10 is substantially choked so that very little air can rush in through the intake opening 30, the only place for the material coming from the supply chute 14 to go is directly downwardly to the lower floor.

According to the present invention, as illustrated in Figs. 4–9, the air inlet bell or cascade 44 can be removed and an automatic diverter plate, indicated generally at 66, can be installed in the opening 30. The construction of this diverter plate 66 is best shown in Figs. 8 and 9. Fig. 8 illustrates a flat blank of sheet metal cut to provide the necessary elements for the diverter or valve plate 66. In the present case, since the opening 30 is substantially rectangular, the plate member 66 is also rectangular. The plate blank is cut with parallel sides 68 and 70 which are spaced just far enough apart to substantially fill the width of the opening 30 between sides 31 and 33.

The plate also has upper and lower edges 72 and 74, respectively, which are spaced apart a distance somewhat less than the length of opening 30 between its top and bottom edges 28 and 32. The upper edge 72 of the diverter plate 66 corresponds in shape to the top edge 28 of the opening, which in this case is perpendicular to the parallel side walls or edges.

At each side of the plate 66 bearing extensions are provided. Thus a bearing extension 76 is provided at edge 68, while a bearing member 80 projects at side 70. The bearing portions 76 and 80 are provided with openings 78 and 82. As shown in the remaining figures, the bearing portions 76 and 80 are bent downwardly at right angles, as viewed from the top in Fig. 8, while the ends 72 and 74 of the plate are curved upward slightly. Thus the plate and its bearing extensions will have the general configuration shown in the side elevation in Figs. 4, 5, and 6. This plate can accordingly be mounted in the plane of the opening 30, with the upper and lower edges of the plate 72 and 74 inclined somewhat inwardly toward the inner portion of the chute as viewed in Fig. 4, and with the bearing portions 76 and 80 projecting outwardly for engagement with a suitable supporting shaft. The supporting shaft 84, as illustrated in Fig. 9, passes through the openings 78 and 82 in the bearing members 76 and 80 and has its ends return bent around the projecting edges or flanges of the frame members 34 as shown at 86 and 88. The clamping engagement of portions 86 and 88 is sufficient to hold the shaft 84 and diverter plate 66 in the desired position within the plane of opening 30, while at the same time the specific location of the shaft 84 can be adjusted by sliding the portions 86 and 88 up and down the frame member to locate the pivotal axis of plate 66 at any desired point in the opening 30.

As shown in Figs. 4–6, the diverter plate 66 is positioned in the upper portion of the opening 30. In other words, the location of supporting shaft 84 is adjusted so that the upper edge 72 of the diverter plate 66 will engage against the upper edge 28 of the frame 34 defining the opening and will thus limit clockwise rotation of the plate as viewed in Fig. 4. Because the plate 66 is shorter from top to bottom than the vertical length of the opening 30, there will be a substantially open area at the lower portion of the opening through which air can enter the pneumatic system as shown by the arrow 92. As already pointed out, some additional air is drawn into the system through the supply chute 14 from the roll stand 20, as indicated by arrows 90.

It will be clear from Fig. 8 that the bearing portions 76 and 80 of the diverter plate 66 are located within the upper half of the plate. In other words, these portions are located somewhere between one-third and one-half the distance from the top toward the bottom of the plate.

During normal operation of the pneumatic system, as illustrated in Fig. 4, the air rushing in through the lower portion of the air intake opening 30 as indicated by arrow 92 will tend to hold the diverter plate 66 in the position of the figure. Thus the stock which is guided downwardly by gravity through the chute 14 in the direction of arrows 90 will be further guided and supported by the diverter plate 66 so that the material is directed toward the main conveyor tube 10 and is picked up by the additional air stream indicated at 92. As long as the conveyer tube 10 is clear and as long as the normal flow of air is maintained, the parts will remain in this relative position and all material coming through the supply chute 14 will be carried in the usual state of suspension by the flow of air involved.

If, however, the material is fed too rapidly through the supply chute 14, a choked condition may be obtained within the conveyer tube 10. A partially choked condition is illustrated at 94 in Fig. 5. As indicated here, the material piles up at 94 in the lower portion of the conveyer tube and intermediate section and thus tends to block the main air inlet opening between the lower edge 74 of diverter plate 66 and the lower edge 32 of opening 30.

As soon as the flow of air at this point is blocked so that the suction at opening 30 is decreased, there will be a tendency for the lower end 74 of plate 66 to drop so that the plate is more nearly vertical. The location of the bearing portions 76 and 80 above the midpoint of plate 66 makes the lower portion of said plate heavier so that it will tend to swing from the position of Fig. 5 toward the position of Fig. 6.

The tendency of plate 66 to swing from the position of Fig. 5 to that of Fig. 6 as soon as a partial choke occurs is also increased because of the tendency of the system to try to draw air in through opening 30 at the upper edge 72 of the plate as shown by arrow 96 in Fig. 5. When the lower portion of the conveyer tube 10 becomes blocked there is a greater tendency to draw the remaining flow of necessary air through the upper portions of opening 30 and this tendency also helps rock the plate 66 to the diverting position of Fig. 6.

As soon as the plate 66 begins to swing in this manner, the upper edge 72 of the plate will project inwardly within the supply chute 14 and will extend across the path of the material being fed through the chute. The plate 66 will accordingly divert the material away from the main conveyer tube 10 as indicated by the arrow 98. At the same time some of the material which has piled up as indicated at 94 in Fig. 5 will be permitted to drop out of the lower portion of the opening 30 at the point indicated by the arrow 100 in Fig. 6.

In some cases, this diverting action is improved if the supporting shaft 84 is moved downwardly as indicated for example by the dotted line position of Fig. 7, so that there will be a space or opening between the upper edge 72 of the plate and the upper edge 28 of the opening 30. Thus part of the normal supply of air required by the pneumatic conveyer would be received through opening 30 both above and below the plate. As the lower portion of the conveyer tube becomes choked, the differential pressure on the plate, particularly at its upper portion, will tend to rotate the plate to the diverting position. Thus an important feature of the present invention is the provision of means for vertical adjustment of the location of the pivotal axis of the plate between the upper and lower edges of opening 30.

In the operation of the device according to the present invention, there is the very definite advantage that the diverter plate 66 can be so adjusted that it will function automatically to move from the position of Fig. 4 to the position of Fig. 6 as soon as a partial choke occurs. As long as the choke is only partial, there will still be an unchoked area in the upper portion of the main conveyer tube 10 through which air can flow. The air flowing through this area can itself pick up the extra material and clean the tube 10 to relieve the choked condition. Therefore the present invention furnishes means of diverting the stock from the supply chute the moment a partial choke occurs and thus giving the system an opportunity to clear itself out without complete clogging of the main conveyer or supply chute or roll stand. It is then only necessary to manually tilt the diverter plate 66 back from the position of Fig. 6 to the position of Fig. 4 as soon as the observer notes that the choked condition has been relieved.

A construction has accordingly been provided which accomplishes the objects set forth at the beginning of this specification.

Since minor variations and changes in the exact details of construction will be apparent to persons skilled in this field, it is intended that this invention shall cover all such changes and modifications as fall within the spirit and scope of the appended claims.

Now, therefore, I claim:

1. An automatic diverter for a pneumatic conveyer having a suction leg and a hopper above the leg for supplying material downwardly by gravity flow to the leg, comprising an inclined wall guiding and supporting the material between the hopper and leg, said wall having an air inlet opening therein, a valve plate, and means pivotally mounting the plate in said opening for rotation on an axis lying in the plane of the wall and extending transversely thereof, between an operating position in which the plate lies in the plane of the wall and guides the material to the leg, and a dumping position in which it intercepts the material from the hopper and diverts it away from the suction leg, the relative area, weight and location of the plate and the relative location of its pivotal axis requiring automatic movement of the plate from operating to dumping position in response to substantial reduction in the volume rate of flow through the suction leg.

2. An automatic diverter according to claim 1 in which the valve plate, in its operating position, covers only the upper portion of the inlet opening.

3. An automatic diverter according to claim 1 in which the mounting means for the valve plate is adjustable along the wall in a direction perpendicular to said axis to vary the position of the plate within the opening.

4. An automatic diverter according to claim 1 in which the valve plate is rectangular and includes portions extending above and below the shaft.

5. An automatic diverter for a pneumatic conveyor having a suction leg extending in one direction and a supply chute extending downwardly toward the suction leg and intersecting the suction leg at an angle, which comprises a downwardly inclined lower wall portion on the chute at the point of intersection with the suction leg, said wall having an air intake opening therein, and a diverting plate mounted in the opening for pivotal movement on an axis lying in the plane of the opening and extending transversely across the opening at a point spaced substantially from both the upper and lower edges of the opening, the plate having upper and lower portions extending above and below the axis, with the upper portion having the size and shape of that part of the opening above the axis and the lower portion having a size and shape smaller than that part of the opening below the axis, the relative area, weight and location of the plate and the relative location of its pivotal axis requiring automatic movement of the plate from operating to dumping position in response to substantial reduction in the volume rate of flow through the suction leg.

6. An automatic diverter for a pneumatic conveyer having a suction leg extending in one direction and a supply chute extending downwardly toward the suction leg and intersecting the suction leg at an angle, which comprises a downwardly inclined lower wall portion on the chute at the point of intersection with the suction leg, said wall having an air intake opening therein, and a diverting plate mounted in the opening for pivotal movement on an axis lying in the plane of the opening and extending transversely across the opening at a point spaced substantially from both the upper and lower edges of the opening, the plate having upper and lower portions extending above and below the axis, with the upper portion having the size and shape of that part of the opening above the axis and the lower portion having a size and shape smaller than that part of the opening below the axis, and with the upper portion of the diverter plate being smaller than the lower portion and with said axis located within the upper half of said opening.

7. An automatic diverter for a penumatic conveyer having a horizontal suction leg and a downwardly inclined supply chute intersecting the suction leg for feeding material thereto, which comprises an inclined bottom wall in the chute, said wall having a rectangular opening therein with top and bottom edges extending perpendicularly across the wall, a rectangular diverting plate having substantially the same width as the opening, but shorter than the opening, and means mounting the plate in the opening for pivotal movement around an axis lying in the plane of the opening and parallel to said top edge but spaced substantially below it, the plate being movable from an operating position in which it lies in the plane of the opening and closes the upper portion thereof to a diverting position in which an upper portion of the plate extends inwardly of the chute in the path of the material to divert the material away from the suction leg, the relative area, weight and location of the plate and the relative location of its pivotal axis requiring automatic movement of the plate from operating to dumping position in response to substantial reduction in the volume rate of flow through the suction leg.

8. A combination material supply and air inlet valve for a pneumatic conveyor having a suction leg of enclosed section with opposed upper and lower wall portions, which comprises a material supply chute having a lower wall inclined downwardly to the bottom wall of the suction conveying leg, said wall having an air inlet opening defined by upper and lower edges with the lower edge on a level substantially below the top wall portion of the suction leg, and a diverter plate pivoted in said opening for rotation on a transverse axis located at an intermediate portion of both the opening and plate, the relative area, weight and location of the plate and the relative location of its pivotal axis requiring automatic movement of the plate from operating to dumping position in response to substantial reduction in the volume rate of flow through the suction leg.

9. A pneumatic conveyer according to claim 8 in which the lower edge of the air inlet opening is at subtsantially the same level as the bottom wall portion of the suction leg.

10. A pneumatic conveyer according to claim 8 in which the diverter plate has a width substantially the same as the opening and is shorter than the opening.

11. A pneumatic conveyer according to claim 8 in which the axis of the diverter plate pivot is located above the center of the opening.

12. A combination material supply and air inlet valve for a pneumatic conveyer having a suction leg of enclosed section with opposed upper and lower wall portions, which comprises a material supply chute having a lower wall inclined downwardly to the bottom wall of the suction conveying leg, said wall having an air inlet opening defined by upper and lower edges with the lower edge on a level substantially below the top wall portion of the suction leg, and a diverter plate pivoted in said opening for rotation on a transverse axis located at an intermediate portion of both the opening and plate, the axis of said diverter plate pivot being located above the center of the opening and also located above the center of the plate.

RANDALL J. CHILDRESS.

References Cited in the file of this patent

UNITED STATES PATENTS

| Number | Name | Date |
|---|---|---|
| 620,270 | Bradford | Feb. 28, 1899 |
| 620,854 | Schuman | Mar. 7, 1899 |
| 636,372 | Williamson | Nov. 7, 1899 |

FOREIGN PATENTS

| Number | Country | Date |
|---|---|---|
| 325,615 | Germany | Sept. 16, 1920 |